United States Patent [19]
Roberts

[11] Patent Number: 5,107,675
[45] Date of Patent: Apr. 28, 1992

[54] GAS TURBINE ENGINE
[75] Inventor: Derek A. Roberts, Bristol, England
[73] Assignee: Rolls-Royce Limited, London, England
[21] Appl. No.: 534,573
[22] Filed: Sep. 12, 1983
[30] Foreign Application Priority Data Mar. 18, 1983 [EP] European Pat. Off. ........ 83301512.6

[51] Int. Cl.⁵ .............................................. F02K 3/06
[52] U.S. Cl. ..................................... 60/226.1; 60/232; 239/265.35
[58] Field of Search .................... 60/226.1, 226.3, 232, 60/263; 239/265.35; 244/12.5

[56] References Cited

U.S. PATENT DOCUMENTS

| | | | |
|---|---|---|---|
| 2,968,452 | 1/1961 | Cook | 244/12.5 |
| 3,913,321 | 10/1975 | Snell | 60/226.3 |
| 4,038,818 | 8/1977 | Snell | 60/226.3 |
| 4,474,345 | 10/1984 | Musgrove | 244/12.5 |

FOREIGN PATENT DOCUMENTS 1511723 5/1978 United Kingdom .

Primary Examiner—Stephen C. Bentley
Attorney, Agent, or Firm—Oliff & Berridge

[57] ABSTRACT

A gas turbine engine of the type comprising a first compressor 4, a second compressor 6, a combustor 8 and turbines 10 for driving the compressors 4 and 6 is provided with an air intake 16, leading to the second compressor 6. The flow from the first compressor 4 is discharged through vectorable nozzles 12,14. The nozzles 12,14 are movable between a first position where they discharge to ambient and a second position where they register with the intake 16 and the flow from the first compressor 4 discharges to the second compressor 6.

20 Claims, 6 Drawing Sheets

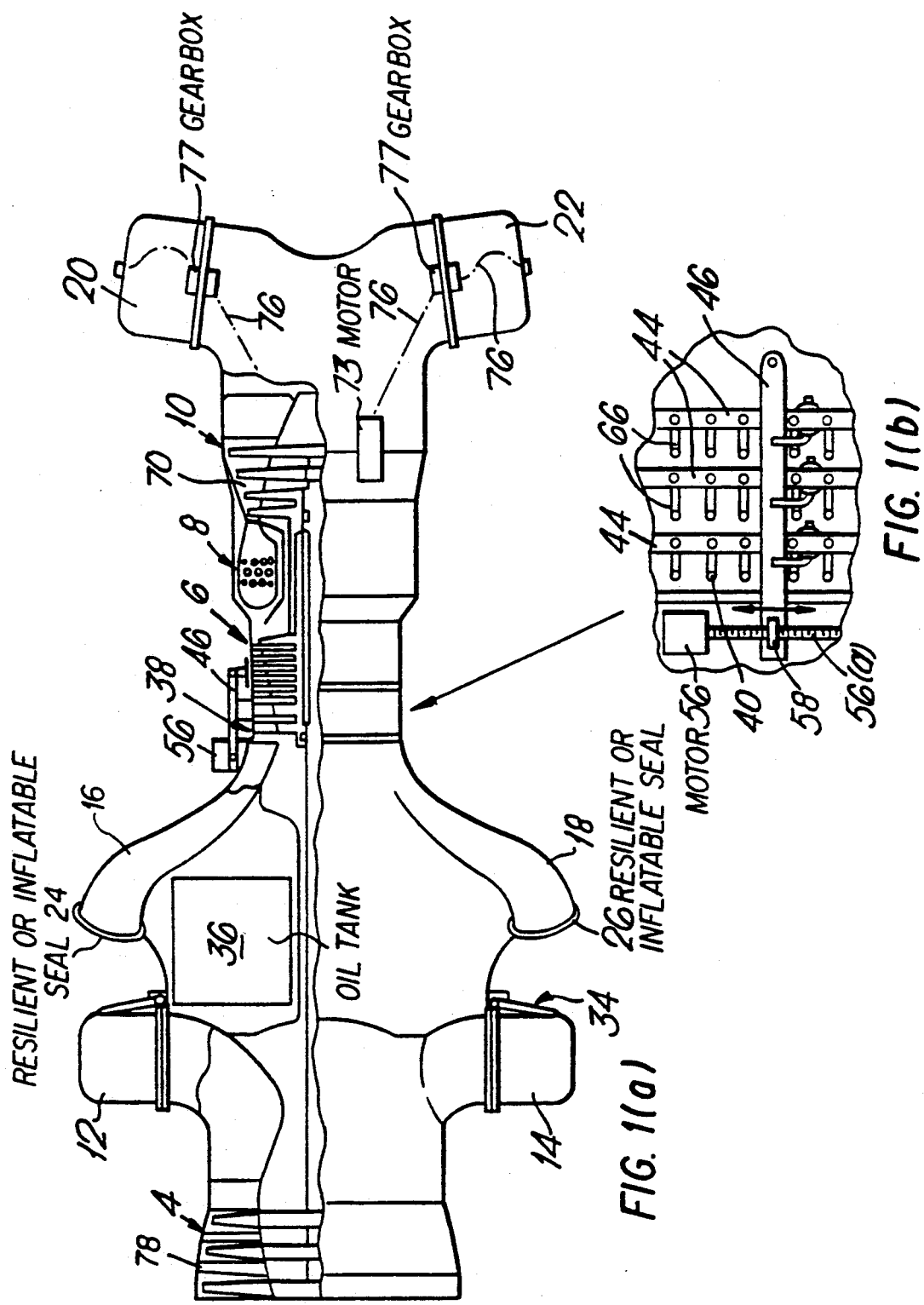

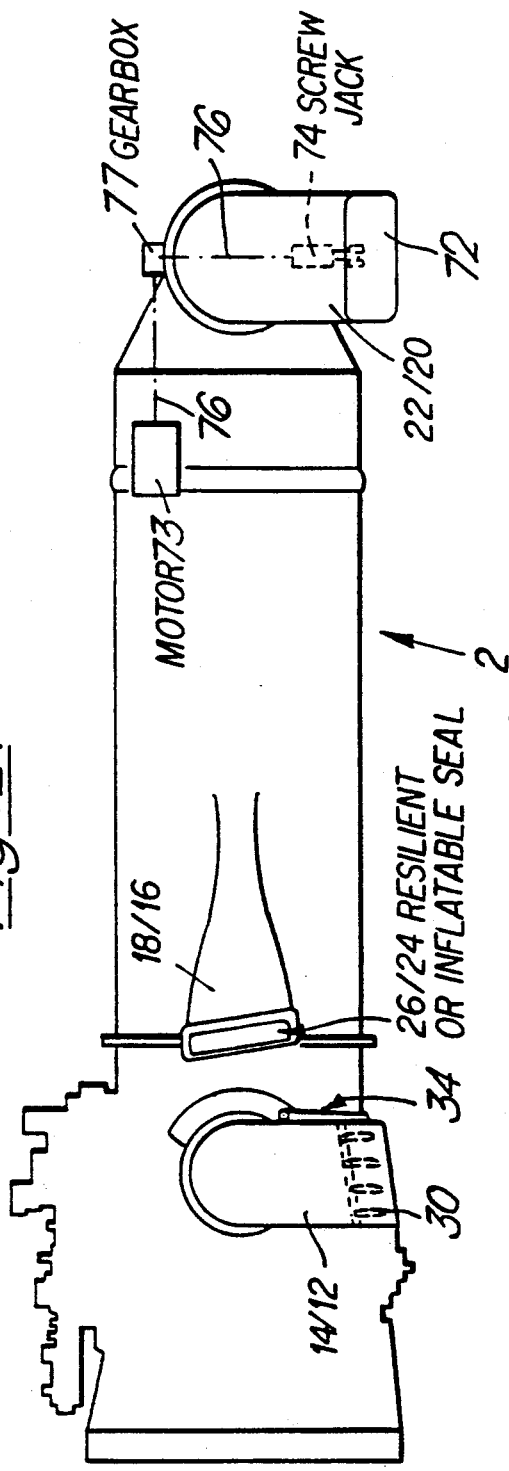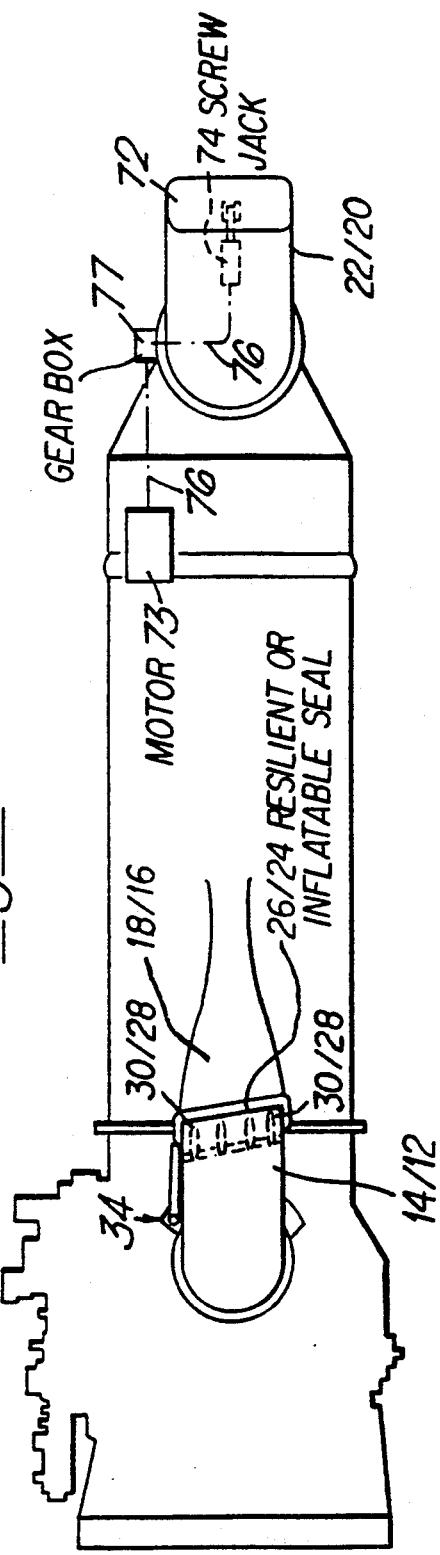

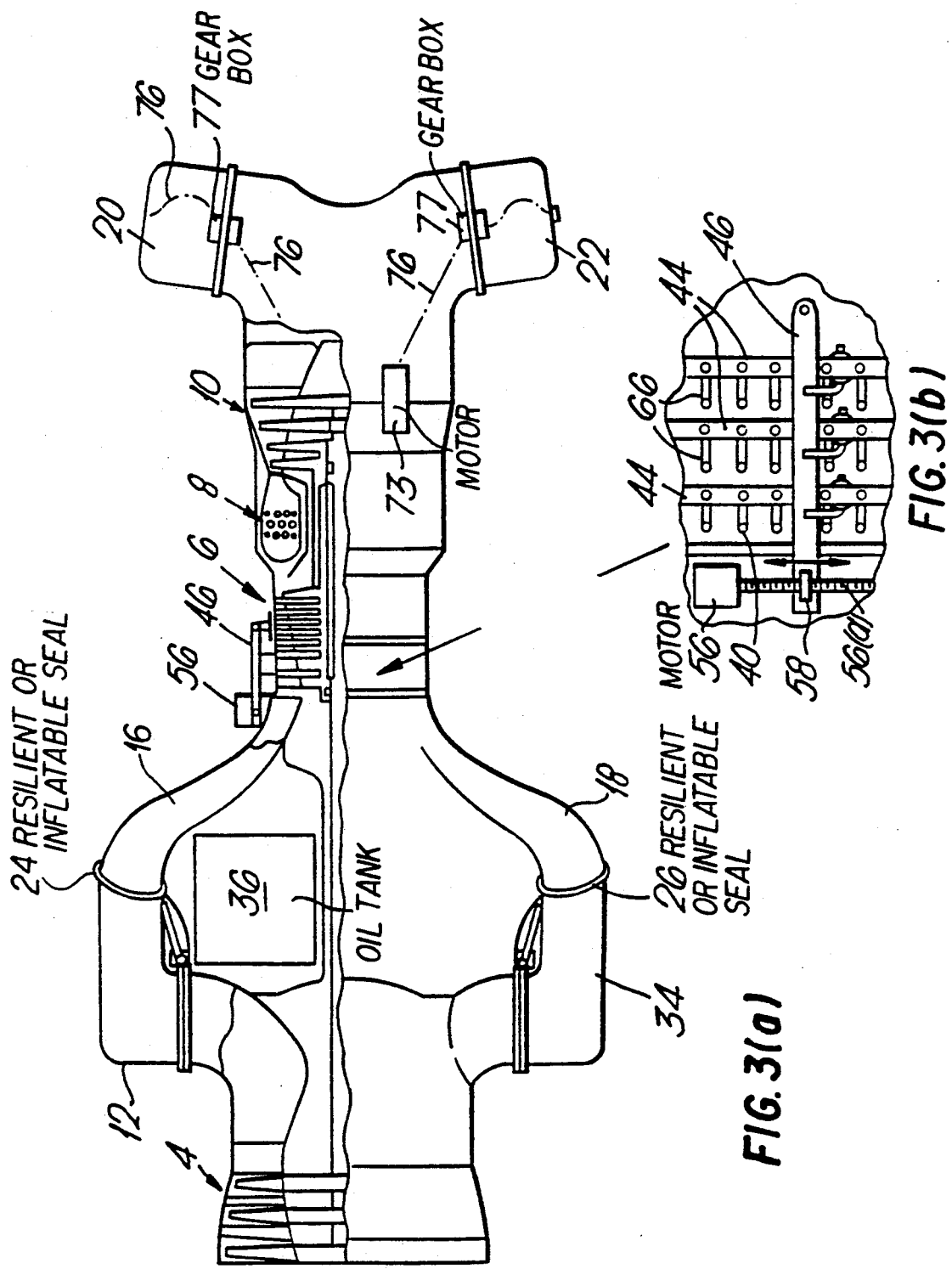

GAS TURBINE ENGINE

This invention relates to variable cycle gas turbine engines and in particular to variable cycle gas turbine engines having vectorable outlets to give an aircraft fitted with such an engine a capability for vertical flight or short take-off and landing (V/STOL).

Variable cycle engines are generally disclosed in U.S. Pat. Nos. 3,913,321 or 4,038,818 (assigned to Rolls-Royce Limited). In general, these engines comprise a first axial flow compressor and a core engine comprising, in flow series, a second compressor, combustion equipment, and turbines to drive the first and second compressors. The engines are capable of operating in two distinct modes. These modes are namely a "series flow" mode and a "parallel flow" mode. In the series flow mode the first and second compressors are connected in flow series and the whole output flow of the first compressor supercharges the second compressor. In the "parallel flow" mode the output flow of the first compressor is prevented from supercharging the second compressor and is discharged to ambient air through either a by-pass duct or through fixed or vectorable discharge nozzles, and simultaneously an auxilliary air intake is opened up to allow air to enter the second compressor.

Variable cycle engines of the type described above offer many advantages, particularly for aircraft requiring vertical take-off and landing and also supersonic forward flight capabilities. The engine performance can be optimised for vertical take-off and landing and subsonic flight during the parallel flow mode and optimised for forward supersonic flight during the series flow mode. In this way, for vertical flight, the well proven advantages of engines such as the Rolls-Royce Limited Pegasus engine (used to power the British Aerospace AV8A Harrier or the British Aerospace/McDonnell Douglas Av8B) can be exploited whilst enabling efficient use of the engine in the series flow mode for supersonic flight.

To enable the output flow from the first compressor to be redirected selectively for series or parallel modes of operation, it is usual to provide a diverter valve downstream of the first compressor but upstream of the second compressor. Examples of such diverter valves are described in the above mentioned patents. The problems associated with these known diverter valves reside in their complexity, weight, cost and disruptive effect on the thermodynamic cycle of the engine during transition from the series flow mode to the parallel flow mode. In general, the disruption to flow is due to the slow speed of the operation of the diverter valve flaps and doors and the fact that many movable parts such as doors and flaps are positioned in the airflow path and have to be operated in unison.

An object of the present invention is to provide a variable cycle engine of the type described above with a diverter valve means which is simple to operate, is lightweight, relatively inexpensive and provides a relatively uncluttered flow path during both modes of operation.

The invention, as claimed, provides a substantially unrestricted flow path from the first compressor to the nozzles or to the inlet of the second compressor and utilizes the vectorable nozzles as a diverter valve. This eliminates the provision of additional heavy and costly diverter valves.

FIGS. 1 and 2 show, respectively, a part sectioned plan view and side elevation of an engine constructed in accordance with the present invention, showing the engine in one configuration.

FIGS. 3 and 4 show the engine of FIGS. 1 and 2 in a second configuration.

Figure 5:
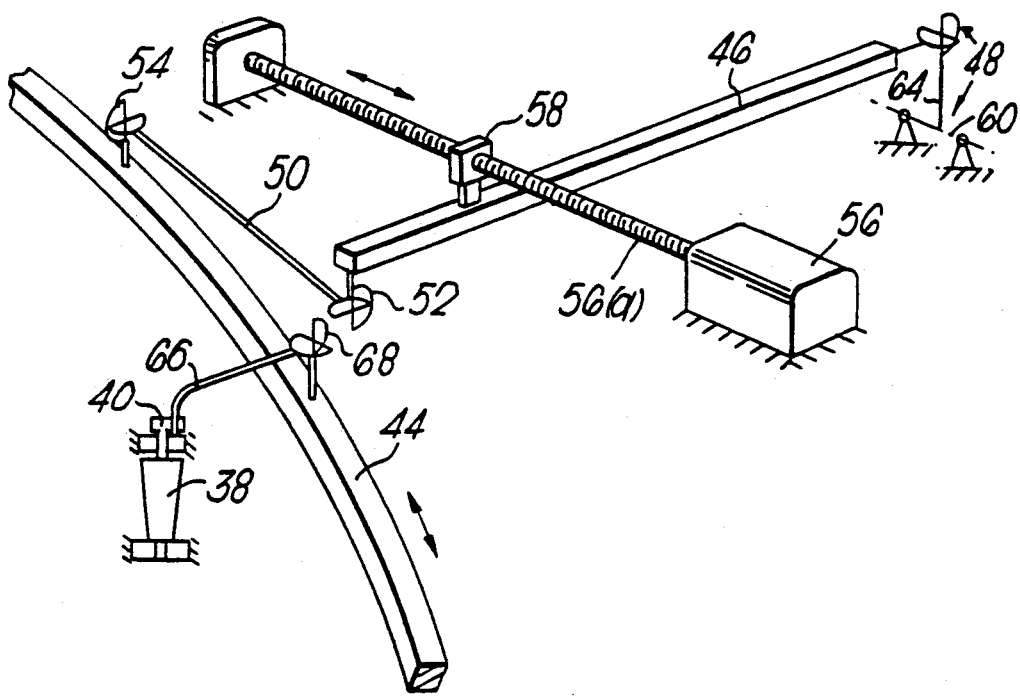
FIG. 5 illustrates schematically a known mechanism for varying the angles of a number of rows of stator vanes of one of the compressors of the engine of FIGS. 1 to 4.

Referring firstly to FIGS. 1 to 4 generally, a gas turbine engine 2 for powering an aircraft to give vertical or short take-off and landing capability, comprises a first compressor 4, a second compressor 6, a combustor 8 and a turbine 10 for driving the compressors. Airflow enters the first compressor 4 from atmosphere and exhausts through two vectorable nozzles 12,14. Airflow enters the second compressor 6 through two intakes 16,18 arranged (as will be described in greater detail hereafter) adjacent the vectorable nozzles 12,14 and exhausts via the combustor 8, and turbine 10 through two vectorable nozzles 20,22.

Referring now particularly to FIGS. 1 and 2, when the engine is required to produce vertical thrust on the aircraft, i.e. a thrust normal to the axis of the engine, the nozzles 12,14 and 20,22 are vectored downwards, as shown. In this configuration the airflow into the first compressor 4 is from atmosphere at the front of the engine and the discharge from the first compressor exhausts to atmosphere to produce vertical thrust via the nozzles 12,14. The airflow into the second compressor 6 is from atmosphere via the intakes 16,18 and the discharge from the second compressor exhausts to atmosphere via the combustion 8 and turbine 10 to produce vertical thrust via the nozzles 20,22. In this way the compressors 4 and 6 work in parallel producing a large mass flow at low speed, suitable for take-off.

Referring now particularly to FIGS. 3 and 4, when the engine is required to produce forward thrust on the aircraft, i.e. thrust parallel to the axis of the engine, the nozzles 12,14 are vectored rearwards, as shown. The intakes 16,18 are arranged relative to the nozzles 12,14 so that in this configuration each of the nozzles 12,14 registers with a respective one of the intakes 16,18. In this configuration the intake to the first compressor 4 is from atmosphere at the front on the engine and the discharge from the first compressor exhausts via the nozzles 12,14 into the intakes 16,18 to constitute the intake to the second compressor 6. The discharge from the second compressor 6 exhausts via the combustor 8 and turbine 10 to produce forward thrust via the nozzles 20,22. In this way the compressors 4 and 6 work in series, producing a smaller mass flow at high speed than when working in parallel, as in FIGS. 1 and 2, making this configuration suitable for high-speed forward flight.

In order to enable good transfer of flow from the nozzles 12,14 to the intakes 16,18 when the compressors are working in series, a resilient seal 24,26 is provided at the lip of each intake. The seals 24,26 are inflatable and are inflated, as shown in FIGS. 2 and 4 to seal between each intake and its respective nozzle when the nozzle is in registry with the intake.

Figure 6:
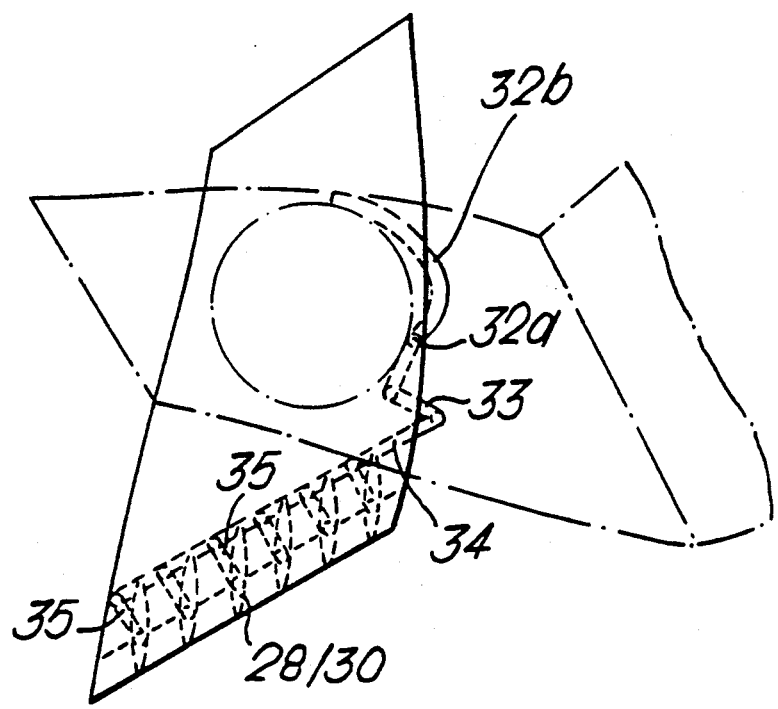
FIG. 6 illustrates schematically the mechanism for varying the outlet area of the front nozzles of the engine of FIGS. 1 to 4.

It is necessary to reduce the exit area of the nozzles 12,14 when they are moved out of register with the intakes 16,18 to increase the pressure drop across them and optimise their function in this configuration. Each nozzle 12,14 is provided with a set of variable exit guide vanes 28,30 (see FIG. 6). The setting of the exit guide vanes 28,30 is controlled by a cam 32(a), cam track 32(b), bell crank 33, levers 35 and push rods 34. The nozzle exit guide vanes 28,30 restrict the nozzle exit area as soon as the nozzles move out of register with the intakes 16,18. During transition from the rearwards position to the downwards position, the vanes 28,30 may be angled to turn the flow discharging from the nozzle rearwards to give the discharge a substantial rearward component.

It will be appreciated that the space formed between the first compressor 4 and the second compressor may be used to site bulky ancillary engine components such as oil tank 36.

It will be appreciated that the core engine, that is to say the compressor 6, combustor 8 and turbine 10, have to be designed to operate with widely different flow conditions.

In one mode of operation (the "series flow" mode) the inlet air to the compressor 6 is supercharged by the compressor 4. In the "parallel flow" mode the air is not supercharged. To maximise thrust it is necessary to provide a higher pressure ratio compressor and avoid the compressor stalling.

Referring to FIG. 5, the compressor 6 may be provided with variable stator vanes 38, each of which is pivotally mounted at its outer end on a spigot 40. Levers 66 are provided to connect each spigot 40 to a unison ring 44. There is provided one unison ring for each row of stator vanes. A beam 46 is provided which is mounted on a double pivot 48 of the type described in our British Patent No. 1,511,723. The beam 46 has links 50 mounted on universal connections 52 and the links 50 are connected to the unison rings 44 by universal connections 54. A motor 56, which drives a lead screw 56(a) which engages a nut 58 on the otherwise free end of the beam 46, is provided for moving the beam 46 about the axes 60,64 and, thereby, rotate the unison rings 44. The vanes 38 are connected to the unison rings by levers 66 and universal connectors 68. Rotation of the rings 44 causes simultaneous rotation of all the stator vanes 38 in each row. This mechanism is fully described in our British Patent No. 1,511,723.

Additionally or alternatively, the turbines may be provided with variable position guide vanes 70 to control the flow through the turbines.

Additionally or alternatively, the flow through the core engine may be controlled by means of variable area nozzles. There are many well known ways of varying the area of the nozzles. One may employ an axisymmetric array of petals (not shown) or a two-dimensional nozzle which employs one or more movable plates 72 (see FIGS. 2 and 4) which can be moved to alter the area of the nozzle by means of a motor 73 which drives a screw jack 74 by way of flexible drive shafts 76 and gearbox 77.

Additionally or alternatively, the inlet guide vanes 78 of the compressor 4 may be of variable geometry.

Figure 7:
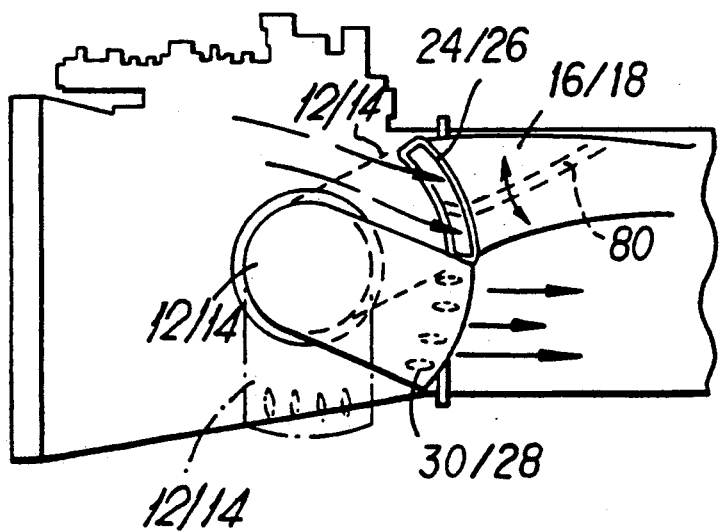
FIG. 7 illustrates a modified air intake for the engine of FIG. 1 which enables the aircraft to be flown in forward flight without supercharging the core engine.

The intakes 16,18 may be repositioned as shown in FIG. 7 so that the nozzles 12,14 have to be rotated to a slightly upwards position when it is required for them to register with the intakes 16,18. Subsonic cruise can be obtained, without supercharging the core engine, by rotating the nozzles 12,14 to a position where they discharge rearwards. If necessary, the exit guide vanes in the nozzles 12,14 may be angled to turn the efflux rearwards to enhance the forward thrust. In all positions of the nozzles 12,14 up until they register with the intakes 16,18, the exit areas are reduced.

Figure 8:
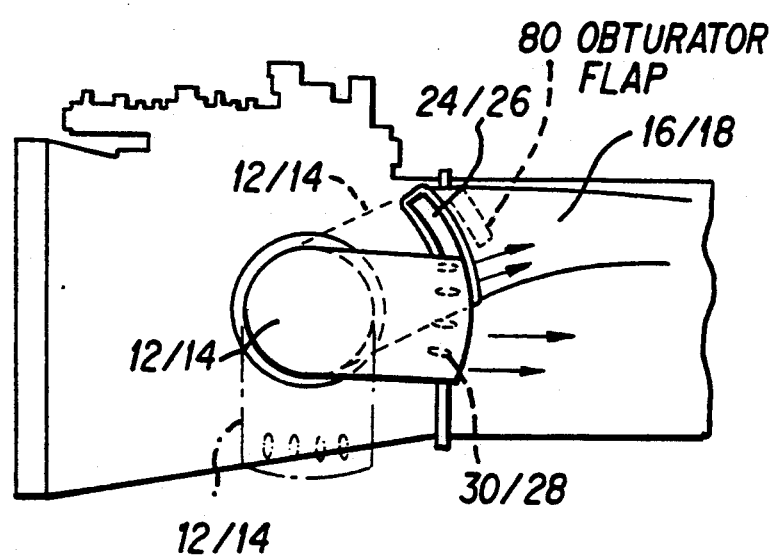
FIG. 8 illustrates a modified air intake for the engine of FIG. 1 which utilizes an obturator flap to allow for a "by-pass" mode of operation.

In yet a further embodiment, (FIG. 8) the air intakes 16,18 may be designed to allow for a "by-pass" mode of operation in which, when the nozzles 12,14 are directed rearward (but not fully mating with the intakes 16,18), part of the efflux of the nozzles 12,14 is discharged into the core engine and part is discharged rearwardly but not through the core engine. In this case, an obturator flap 80 would be provided at the lip of each intake. The obturator flap would operate to close down each air intake 16,18 to an area equal to the area of that part of each nozzle 12,14 directly communicating with the interior of the air intake.

I claim:
1. A gas turbine engine comprising:
   a first compressor;
   a second compressor;
   a combustor;
   turbine means for driving the first and second compressors;
   first intake means for a flow to enter the first compressor;
   first outlet means for discharging the flow from the first compressor;
   second intake means for a flow to enter the second compressor; and
   second outlet means for discharging the flow from the second compressor via the combustor and the turbine means,
   wherein the first outlet means comprises a pivotal nozzle vectorable between a first position in which the flow from the first compressor discharges substantially downwardly to ambient and a second position in which the pivotal nozzle registers with the second intake means and the flow from the first compressor discharges into the second compressor.

2. A gas turbine engine according to claim 1 wherein resilient seal means is provided to seal between the first outlet means and the second intake means when the first outlet means is in the second position.

3. A gas turbine engine according to claim 2 wherein the resilient seal means is inflatable.

4. A gas turbine engine according to claim 1 in which, when the optimum flow of working medium through the engine is that in which the first outlet means is in the second position and the first and second compressors are each running at a predetermined speed, flow control means are provided for controlling the flow of the working medium through the first compressor, the second compressor and the turbine means to prevent the first and second compressors from stalling when operated at or below said predetermined speeds.

5. A gas turbine engine according to claim 4 wherein the flow control means comprises stator vanes, the angle of attack of which is variable to vary the flow through the engine.

6. A gas turbine engine according to claim 4 wherein the flow control means comprises means for varying the exit area of the first outlet means so as to produce an exit area smaller than the exit area when the first outlet means is in the second position when the first outlet means is in any position other than the second position.

7. A gas turbine engine according to claim 4 wherein the flow control means comprises means for varying the exit area of the second outlet means.

8. A gas turbine engine according to claim 1 wherein the first outlet means is movable to a third position, intermediate the first and second positions, where the first outlet means discharges partly into the second air intake means and also rearwards alongside the second air intake means, and obturator means are provided to restrict the area of the second air intake means to an area substantially equal to that part of the first outlet means which discharges into the second air intake means.

9. A gas turbine engine according to claim 1 wherein the first outlet means is movable to a third position, intermediate the first and second positions, where the first outlet means discharges rearwards alongside the second air intake means but does not discharge into the second air intake means.

10. A gas turbine engine according to claim 1 wherein the pivotal nozzle is provided with a plurality of flow deflector vanes extending across the flow path through the pivotal nozzle and the vanes are movable to deflect the flow from the pivotal nozzle rearwards during transition of the first outlet means from the second position to the first position.

11. A gas turbine engine comprising:
a first compressor;
a second compressor;
a combustor;
turbine means for driving the first and second compressors;
first intake means for an air flow to enter said first compressor;
second intake means for an air flow to enter said second compressor;
first outlet means for discharging the flow from the first compressor, said first outlet means comprising a pivotal nozzle pivotal between a first position in which the flow from the first compressor is discharged substantially downwardly to ambient atmosphere, and a substantially rearwardly facing second position in which the pivotal nozzle registers with said second intake means, such that the flow from the first compressor is discharged through said nozzle into said second intake means; and second outlet means for discharging the flow from the second compressor through the combustor and turbine means.

12. A gas turbine engine according to claim 11, further comprising resilient seal means on said second intake means for providing a seal between said pivotal nozzle and said second intake means when said pivotal nozzle is in said second position.

13. A gas turbine engine according to claim 12, wherein said resilient seal means is inflatable.

14. A gas turbine engine according to claim 11, further comprising flow control means for controlling said flow through said first compressor, said second compressor and said turbine means when said pivotal nozzle is in said second position so as to prevent said first and second compressors from stalling.

15. A gas turbine engine according to claim 14, wherein said flow control means comprises variable attack angle stator vanes.

16. A gas turbine engine according to claim 14, further comprising means for varying an exit area of said pivotal nozzle such that said exit area is maximized when said pivotal nozzle is in said second position and is reduced in size when said pivotal nozzle is in any position other than the second position.

17. A gas turbine engine according to claim 14, wherein said flow control means comprises means for varying an exit area of said second outlet means.

18. A gas turbine engine according to claim 11, wherein said pivotal nozzle is movable to a third position between said first and second positions, where said pivotal nozzle discharges flow from the first compressor partly into the second intake means and partly substantially rearwardly along side said second intake means, and further comprising obturator means for restricting an entrance area of said second intake means to an area substantially equal to and aligned with the portion of said pivotal nozzle discharging part of the flow into said second intake means when said pivotal nozzle is in said third position.

19. A gas turbine engine according to claim 11, wherein said pivotal nozzle is movable to a third position between said first and second positions, and in which said pivotal nozzle discharges the flow from said first compressor substantially rearwardly along side but not into said second intake means.

20. A gas turbine engine according to claim 1, further comprising a plurality of flow deflector vanes rotatably mounted in and extending across the flow path through said pivotal nozzle, said vanes being movable to deflect the flow from said pivotal nozzle substantially rearwardly when said pivotal nozzle is moving between said first and second positions.

* * * * *